(No Model.)
W. E. PEARSON.
ROTARY LIQUID METER.
No. 380,764. Patented Apr. 10, 1888.
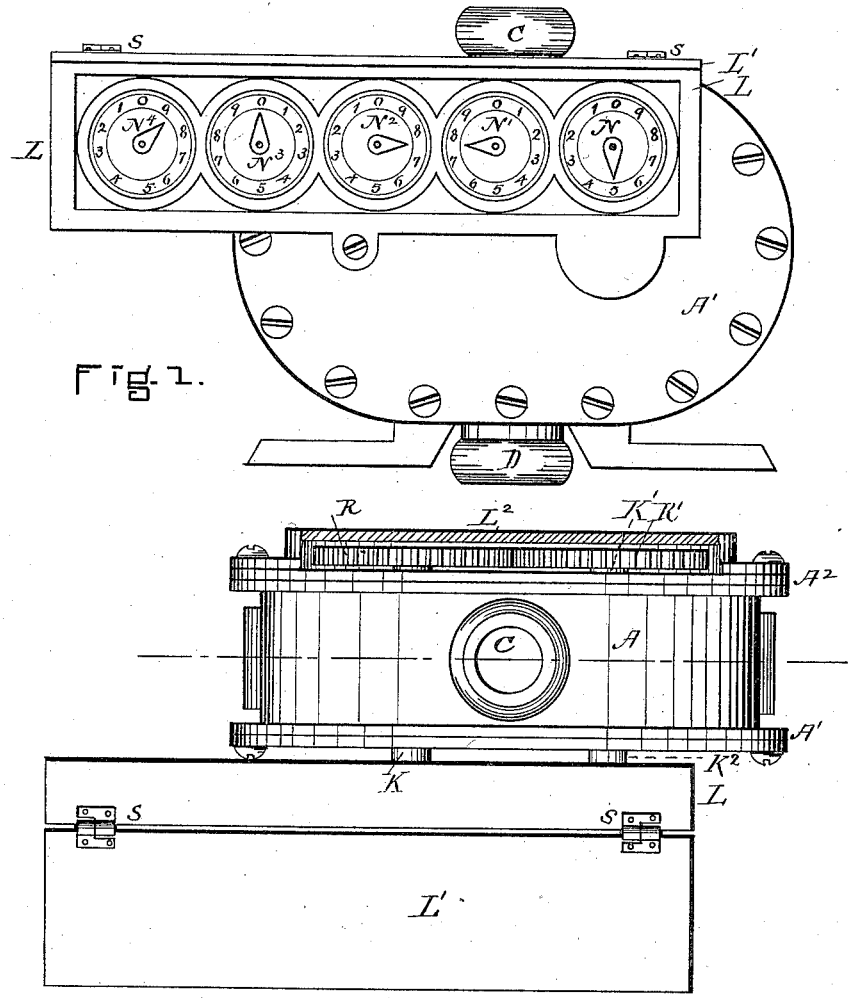
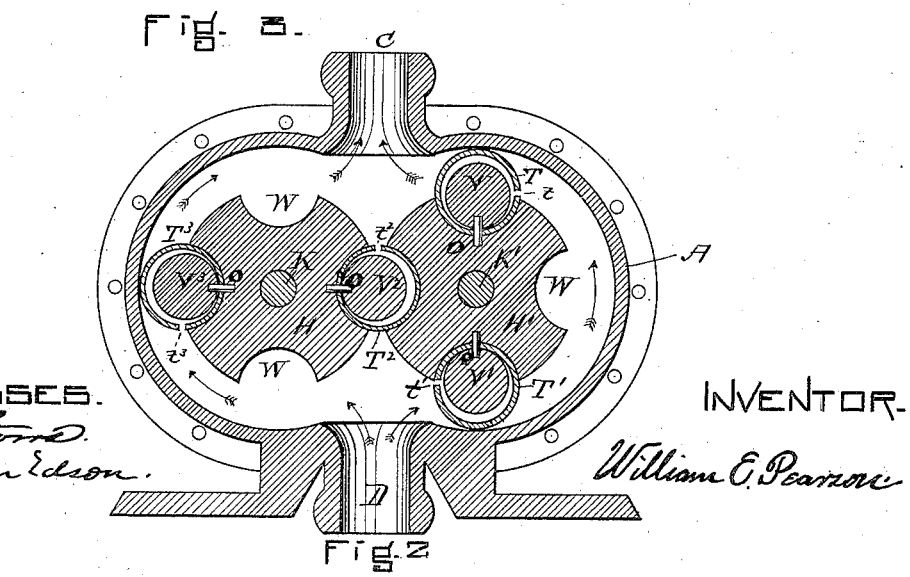
WITNESSES.
R. O. Storrs
William Edson.
INVENTOR.
William E. Pearson

UNITED STATES PATENT OFFICE.

WILLIAM E. PEARSON, OF SAUGUS, ASSIGNOR TO GEORGE R. SWASEY, OF BOSTON, MASSACHUSETTS.

ROTARY LIQUID-METER.

SPECIFICATION forming part of Letters Patent No. 380,764, dated April 10, 1888.

Application filed May 22, 1886. Renewed September 14, 1887. Serial No. 249,689. (No model.)

*To all whom it may concern:*

Be it known that I, WILLIAM E. PEARSON, of Saugus, in the county of Essex and State of Massachusetts, have invented a new and useful Improvement in Liquid-Meters, of which the following, taken in connection with the accompanying drawings, is a specification.

My invention relates to that class of liquid-meters in which rotating buckets are used, the object being to provide the said buckets with automatic balanced valves. This object I attain by the mechanism shown in the accompanying drawings, in which—

Figure 1 is an elevation of my invention. Fig. 2 is a vertical section of the same, taken at right angles to the axes of the rotating buckets, and Fig. 3 is a plan view of the same.

Heretofore the valves of meters of this class have been made more or less automatic, but have not been adequately provided with means for balancing the pressure of the same, or for so constructing them that the pressure of the valves upon the wall of the meter-chamber shall adjust itself accurately to the pressure due to the fluid flowing into the meter. These results I accomplish by the means which I now describe.

In the drawings, A represents the body of the meter case, and A' A² are the side cases of the same.

L, Figs. 1 and 3, represents a register box, said register-box having a lid, L', which is attached to its box by hinges S S, as shown in Figs. 1 and 3, in which it (the lid) is represented as open. Within the register-box L, I have a series of multiplying gears arranged in the ordinary manner and operating the pointers on the dials N N' N² N³ N⁴, as usual.

The buckets H H', Fig. 2, rotate on journals K K', Figs. 2 and 3. These journals have upon them, as shown in Fig. 3, gears R R', of ordinary construction and equal in diameter, so that said buckets always rotate in unison with each other. The journal K' of the bucket H' passes from the meter-case A A' A² through into the register-box L, as shown in Fig. 3, and there connects with the system of register-gears in the register-box.

Each of the buckets H H' is provided with two valves—that is, the bucket H' has attached to it valve T T', and the bucket H has attached to it the valves T² T³. The buckets H H' are also provided with recesses W, as shown in Fig. 2. The valves T T' T² T³ are provided with round center pieces, V V' V² V³, which, together with the valves, are fastened to their respective buckets. Each of the valves T T' T² T³ consists of a tube made of some material of a springing nature—like hard brass, for instance—and is cut through its length, as shown at $t$ $t'$ $t^2$ $t^3$, Fig. 2, so that the inflowing fluid may pass into the interior of the valve, and thus balance the outside pressure upon the same.

The object of inserting the center pieces, V V' V² V³, in the valves T T' T² T³ is to lessen the amount of water constantly held within the valves, so that the meter will fill and empty quickly. The pieces V V' V² V³ are represented in the drawings, Fig. 2, as being made fast to the buckets by small screws, although they may be brazed in, if desired. The recesses W in the buckets receive the valves T T' T² T³ as the buckets rotate.

In the drawings, Figs. 1 and 2, D represents the inlet-port, and C the outlet-port, of the meter. The arrows in Fig. 2 indicate the direction of the flow of the fluid being measured.

L², Fig. 3, is a cap which incloses the gears R R' and fits water-tight to the meter casing, so that it is not necessary to pack the journals K K' at their rear ends. The front end of the journal K does not extend entirely through the front casing, A; hence in my meter I have but one packed joint, and that is of the journal K' at K², Fig. 2.

I claim—

In a fluid-meter, the combination of the rotating buckets H H' with the valves T T' T² T³, each of the said valves having a center piece, V V' V² V³, all adapted to operate together substantially as described, and for the purpose set forth.

WILLIAM E. PEARSON.

Witnesses:
WILLIAM EDSON,
R. O. STORRS.